US008868791B2

(12) United States Patent
Famolari et al.

(10) Patent No.: US 8,868,791 B2
(45) Date of Patent: Oct. 21, 2014

(54) SYSTEM AND METHOD FOR EVALUATING MULTIPLE CONNECTIVITY OPTIONS

(75) Inventors: David Famolari, Stewartsville, NJ (US); Kyriakos Manousakis, New Brunswick, NJ (US); Kaustubh Sinkar, New Brunswick, NJ (US)

(73) Assignees: Toshiba America Research, Inc., Washington, DC (US); Telcordia Technologies, Inc., Piscataway, NJ (US)

( * ) Notice: Subject to any disclaimer, the term of this patent is extended or adjusted under 35 U.S.C. 154(b) by 996 days.

(21) Appl. No.: 12/541,555

(22) Filed: Aug. 14, 2009

(65) Prior Publication Data

US 2010/0083121 A1  Apr. 1, 2010

Related U.S. Application Data

(60) Provisional application No. 61/100,769, filed on Sep. 29, 2008.

(51) Int. Cl.
*G06F 15/16* (2006.01)
*H04L 29/06* (2006.01)
*H04W 48/18* (2009.01)
*H04W 88/06* (2009.01)
*H04W 48/16* (2009.01)

(52) U.S. Cl.
CPC .............. *H04W 48/18* (2013.01); *H04W 88/06* (2013.01); *H04L 69/18* (2013.01); *H04W 48/16* (2013.01)
USPC ........................................................ 709/250

(58) Field of Classification Search
None
See application file for complete search history.

(56) References Cited

U.S. PATENT DOCUMENTS

| 6,560,564 | B2 * | 5/2003 | Scarlat et al. ................. 702/186 |
| 7,010,782 | B2 * | 3/2006 | Narayan et al. ............... 717/124 |
| 7,117,411 | B2 * | 10/2006 | McNeely et al. .............. 714/724 |
| 7,222,255 | B1 * | 5/2007 | Claessens et al. ........... 714/4.12 |
| 7,369,537 | B1 | 5/2008 | Kirchhoff et al. |
| 7,945,678 | B1 * | 5/2011 | Skene ........................... 709/227 |
| 8,254,268 | B2 * | 8/2012 | Qiu et al. ...................... 370/241 |

(Continued)

FOREIGN PATENT DOCUMENTS

| JP | 2006-314084 A | 11/2006 |
| JP | 2008-61015 A | 3/2008 |

(Continued)

OTHER PUBLICATIONS

International Search Report of PCT/US 09/58873, mailing date of Nov. 19, 2009.
Japanese Office Action dated Jul. 24, 2012, issued in corresponding Japanese Patent Application No. 2011-529372, with English translation (9 pages).
Japanese Office Action dated Mar. 26, 2013, issued in corresponding Japanese Patent Application No. 2011-529372, w/ English translation.

(Continued)

*Primary Examiner* — Ario Etienne
*Assistant Examiner* — Clayton R Williams
(74) *Attorney, Agent, or Firm* — Westerman, Hattori, Daniels & Adrian, LLP

(57) ABSTRACT

This present application relates to, among other things, novel techniques to evaluate and qualify multiple networking options. A device contains multiple network connectivity options, including but not limited to various wireless and wired technologies such as Wi-Fi, 3G, WiMAX, LTE, Ethernet, Bluetooth, UWB, WHDMI, etc. Each connectivity option can be evaluation and pre-qualified prior to the user selecting that mode of communication. This evaluation process takes into account both lower-layer information such as signal strength, bit error rates, SNR, interference, etc. but also network-layer information such as IP connectivity, and end-to-end path performance.

34 Claims, 7 Drawing Sheets

(56) References Cited

U.S. PATENT DOCUMENTS

| | | | |
|---|---|---|---|
| 2003/0069957 A1* | 4/2003 | Malmskog et al. | 709/223 |
| 2003/0217179 A1 | 11/2003 | Famolari et al. | |
| 2004/0066759 A1 | 4/2004 | Molteni et al. | |
| 2004/0242221 A1 | 12/2004 | Vincent et al. | |
| 2005/0188262 A1* | 8/2005 | Rosenman et al. | 714/25 |
| 2006/0084417 A1* | 4/2006 | Melpignano et al. | 455/418 |
| 2006/0227717 A1* | 10/2006 | van den Berg et al. | 370/252 |
| 2007/0192863 A1 | 8/2007 | Kapoor et al. | |
| 2008/0056286 A1* | 3/2008 | Forssell et al. | 370/401 |
| 2009/0054061 A1* | 2/2009 | Dawson et al. | 455/434 |
| 2009/0124250 A1* | 5/2009 | Topaltzas et al. | 455/423 |
| 2009/0177801 A1* | 7/2009 | Chambers et al. | 709/250 |

FOREIGN PATENT DOCUMENTS

| | | | |
|---|---|---|---|
| JP | 2010-504700 A | 2/2010 | |
| WO | 2008-029213 A2 | 3/2008 | |
| WO | 2008/036608 A1 | 3/2008 | |

OTHER PUBLICATIONS

Chinese Office Action dated Mar. 27, 2013, issued in corresponding Chinese Patent Application No. 200980143087.5, w/ English translation.

Japanese Office Action dated Apr. 1, 2014, issued in corresponding Japanese Patent Application No. 2013-133510 with English translation (6 pages).

Chinese Office Action dated Feb. 11, 2014, issued in corresponding Chinese Patent Application No. 200980143087.5 with partial English translation (5 pages).

Japanese Office Action dated Jan. 7, 2014, issued in corresponding Japanese Patent Application No. 2013-011488 with English translation (5 pages). Note: JP Action incorrectly lists WO 2008/036608 as 2007/036608.

Chinese Office Action dated Feb. 11, 2014, issued in corresponding Chinese application No. 200980143087.5, w/ English translation (5 pages).

* cited by examiner (INTERFACE Selection)

SYSTEM AND METHOD FOR EVALUATING MULTIPLE CONNECTIVITY OPTIONS

The present application a non-provisional of (and claims priority to) U.S. provisional application Ser. No. 61/100,769, filed Sep. 29, 2008, entitled EVALUATING MULTIPLE CONNECTIVITY OPTIONS, to D. Famolari, et al., the entire disclosure of which is incorporated herein by reference.

BACKGROUND

Background Discussion

Networks and Internet Protocol:

There are many types of computer networks, with the Internet having the most notoriety. The Internet is a worldwide network of computer networks. Today, the Internet is a public and self-sustaining network that is available to many millions of users. The Internet uses a set of communication protocols called TCP/IP (i.e., Transmission Control Protocol/Internet Protocol) to connect hosts. The Internet has a communications infrastructure known as the Internet backbone. Access to the Internet backbone is largely controlled by Internet Service Providers (ISPs) that resell access to corporations and individuals.

With respect to IP (Internet Protocol), this is a protocol by which data can be sent from one device (e.g., a phone, a PDA [Personal Digital Assistant], a computer, etc.) to another device on a network. There are a variety of versions of IP today, including, e.g., IPv4, IPv6, etc. Each host device on the network has at least one IP address that is its own unique identifier. IP is a connectionless protocol. The connection between end points during a communication is not continuous. When a user sends or receives data or messages, the data or messages are divided into components known as packets. Every packet is treated as an independent unit of data.

In order to standardize the transmission between points over the Internet or the like networks, an OSI (Open Systems Interconnection) model was established. The OSI model separates the communications processes between two points in a network into seven stacked layers, with each layer adding its own set of functions. Each device handles a message so that there is a downward flow through each layer at a sending end point and an upward flow through the layers at a receiving end point. The programming and/or hardware that provides the seven layers of function is typically a combination of device operating systems, application software, TCP/IP and/or other transport and network protocols, and other software and hardware.

Typically, the top four layers are used when a message passes from or to a user and the bottom three layers are used when a message passes through a device (e.g., an IP host device). An IP host is any device on the network that is capable of transmitting and receiving IP packets, such as a server, a router or a workstation. Messages destined for some other host are not passed up to the upper layers but are forwarded to the other host. The layers of the OSI model are listed below. Layer 7 (i.e., the application layer) is a layer at which, e.g., communication partners are identified, quality of service is identified, user authentication and privacy are considered, constraints on data syntax are identified, etc. Layer 6 (i.e., the presentation layer) is a layer that, e.g., converts incoming and outgoing data from one presentation format to another, etc. Layer 5 (i.e., the session layer) is a layer that, e.g., sets up, coordinates, and terminates conversations, exchanges and dialogs between the applications, etc. Layer-4 (i.e., the transport layer) is a layer that, e.g., manages end-to-end control and error-checking, etc. Layer-3 (i.e., the network layer) is a layer that, e.g., handles routing and forwarding, etc. Layer-2 (i.e., the data-link layer) is a layer that, e.g., provides synchronization for the physical level, does bit-stuffing and furnishes transmission protocol knowledge and management, etc. The Institute of Electrical and Electronics Engineers (IEEE) sub-divides the data-link layer into two further sub-layers, the MAC (Media Access Control) layer that controls the data transfer to and from the physical layer and the LLC (Logical Link Control) layer that interfaces with the network layer and interprets commands and performs error recovery. Layer 1 (i.e., the physical layer) is a layer that, e.g., conveys the bit stream through the network at the physical level. The IEEE sub-divides the physical layer into the PLCP (Physical Layer Convergence Procedure) sub-layer and the PMD (Physical Medium Dependent) sub-layer.

Wireless Networks:

Wireless networks can incorporate a variety of types of mobile devices, such as, e.g., cellular and wireless telephones, PCs (personal computers), laptop computers, wearable computers, cordless phones, pagers, headsets, printers, PDAs, etc. For example, mobile devices may include digital systems to secure fast wireless transmissions of voice and/or data. Typical mobile devices include some or all of the following components: a transceiver (i.e., a transmitter and a receiver, including, e.g., a single chip transceiver with an integrated transmitter, receiver and, if desired, other functions); an antenna; a processor; one or more audio transducers (for example, a speaker or a microphone as in devices for audio communications); electromagnetic data storage (such as, e.g., ROM, RAM, digital data storage, etc., such as in devices where data processing is provided); memory; flash memory; a full chip set or integrated circuit; interfaces (such as, e.g., USB, CODEC, UART, PCM, etc.); and/or the like.

Wireless LANs (WLANs) in which a mobile user can connect to a local area network (LAN) through a wireless connection may be employed for wireless communications. Wireless communications can include, e.g., communications that propagate via electromagnetic waves, such as light, infrared, radio, microwave. There are a variety of WLAN standards that currently exist, such as, e.g., Bluetooth, IEEE 802.11, and HomeRF.

By way of example, Bluetooth products may be used to provide links between mobile computers, mobile phones, portable handheld devices, personal digital assistants (PDAs), and other mobile devices and connectivity to the Internet. Bluetooth is a computing and telecommunications industry specification that details how mobile devices can easily interconnect with each other and with non-mobile devices using a short-range wireless connection. Bluetooth creates a digital wireless protocol to address end-user problems arising from the proliferation of various mobile devices that need to keep data synchronized and consistent from one device to another, thereby allowing equipment from different vendors to work seamlessly together. Bluetooth devices may be named according to a common naming concept. For example, a Bluetooth device may possess a Bluetooth Device Name (BDN) or a name associated with a unique Bluetooth Device Address (BDA). Bluetooth devices may also participate in an Internet Protocol (IP) network. If a Bluetooth device functions on an IP network, it may be provided with an IP address and an IP (network) name. Thus, a Bluetooth Device configured to participate on an IP network may contain, e.g., a BDN, a BDA, an IP address and an IP name. The term "IP name" refers to a name corresponding to an IP address of an interface.

An IEEE standard, IEEE 802.11, specifies technologies for wireless LANs and devices. Using 802.11, wireless networking may be accomplished with each single base station supporting several devices. In some examples, devices may come pre-equipped with wireless hardware or a user may install a separate piece of hardware, such as a card, that may include an antenna. By way of example, devices used in 802.11 typically include three notable elements, whether or not the device is an access point (AP), a mobile station (STA), a bridge, a PCMCIA card or another device: a radio transceiver; an antenna; and a MAC (Media Access Control) layer that controls packet flow between points in a network.

In addition, Multiple Interface Devices (MIDs) may be utilized in some wireless networks. MIDs may contain two independent network interfaces, such as a Bluetooth interface and an 802.11 interface, thus allowing the MID to participate on two separate networks as well as to interface with Bluetooth devices. The MID may have an IP address and a common IP (network) name associated with the IP address.

Wireless network devices may include, but are not limited to Bluetooth devices, Multiple Interface Devices (MIDs), 802.11x devices (IEEE 802.11 devices including, e.g., 802.11a, 802.11b and 802.11g devices), HomeRF (Home Radio Frequency) devices, Wi-Fi (Wireless Fidelity) devices, GPRS (General Packet Radio Service) devices, 3G cellular devices, 2.5G cellular devices, GSM (Global System for Mobile Communications) devices, EDGE (Enhanced Data for GSM Evolution) devices, TDMA type (Time Division Multiple Access) devices, or CDMA type (Code Division Multiple Access) devices, including CDMA2000. Each network device may contain addresses of varying types including but not limited to an IP address, a Bluetooth Device Address, a Bluetooth Common Name, a Bluetooth IP address, a Bluetooth IP Common Name, an 802.11 IP Address, an 802.11 IP common Name, or an IEEE MAC address.

Wireless networks can also involve methods and protocols found in, e.g., Mobile IP (Internet Protocol) systems, in PCS systems, and in other mobile network systems. With respect to Mobile IP, this involves a standard communications protocol created by the Internet Engineering Task Force (IETF). With Mobile IP, mobile device users can move across networks while maintaining their IP Address assigned once. See Request for Comments (RFC) 3344. NB: RFCs are formal documents of the Internet Engineering Task Force (IETF). Mobile IP enhances Internet Protocol (IP) and adds means to forward Internet traffic to mobile devices when connecting outside their home network. Mobile IP assigns each mobile node a home address on its home network and a care-of-address (CoA) that identifies the current location of the device within a network and its subnets. When a device is moved to a different network, it receives a new care-of address. A mobility agent on the home network can associate each home address with its care-of address. The mobile node can send the home agent a binding update each time it changes its care-of address using, e.g., Internet Control Message Protocol (ICMP).

In basic IP routing (e.g., outside mobile IP), routing mechanisms rely on the assumptions that each network node always has a constant attachment point to, e.g., the Internet and that each node's IP address identifies the network link it is attached to. In this document, the terminology "node" includes a connection point, which can include, e.g., a redistribution point or an end point for data transmissions, and which can recognize, process and/or forward communications to other nodes. For example, Internet routers can look at, e.g., an IP address prefix or the like identifying a device's network. Then, at a network level, routers can look at, e.g., a set of bits identifying a particular subnet. Then, at a subnet level, routers can look at, e.g., a set of bits identifying a particular device. With typical mobile IP communications, if a user disconnects a mobile device from, e.g., the Internet and tries to reconnect it at a new subnet, then the device has to be reconfigured with a new IP address, a proper netmask and a default router. Otherwise, routing protocols would not be able to deliver the packets properly.

Media Independent Handover Services:

In I.E.E.E. P802.21/D.01.09, September 2006, entitled Draft IEEE Standard for Local and Metropolitan Area Networks: Media Independent Handover Services, among other things, the document specifies 802 media access-independent mechanisms that optimize handovers between 802 systems and cellular systems. The I.E.E.E. 802.21 standard defines extensible media access independent mechanisms that enable the optimization of handovers between heterogeneous 802 systems and may facilitate handovers between 802 systems and cellular systems. For background reference and education purposes, portions of said I.E.E.E. 802.21 are reproduced below.

The scope of the IEEE 802.21 (Media Independent Handover) standard is to develop a specification that provides link layer intelligence and other related network information to upper layers to optimize handovers between heterogeneous media. This includes links specified by 3GPP, 3GPP2 and both wired and wireless media in the IEEE 802 family of standards. Note, in this document, unless otherwise noted, "media" refers to method/mode of accessing a telecommunication system (e.g. cable, radio, satellite, etc.), as opposed to sensory aspects of communication (e.g. audio, video, etc.). See, e.g., 1.1 of I.E.E.E. P802.21/D.01.09, September 2006, entitled Draft IEEE Standard for Local and Metropolitan Area Networks: Media Independent Handover Services.

Illustrative Architecture:

FIG. 1 depicts some illustrative architectural components that can be employed in some illustrative and non-limiting implementations including wireless access points to which client devices communicate. In this regard, FIG. 1 shows an illustrative wireline network 20 connected to a wireless local area network (WLAN) generally designated 21. The WLAN 21 includes an access point (AP) 22 and a number of user stations 23, 24 (i.e., mobile device user stations). For example, the wireline network 20 can include the Internet or a corporate data processing network. For example, the access point 22 can be a wireless router, and the user stations 23, 24 can be, e.g., portable computers, personal desk-top computers, PDAs, portable voice-over-IP telephones and/or other devices. The access point 22 has a network interface 25 linked to the wireline network 21, and a wireless transceiver in communication with the user stations 23, 24. For example, the wireless transceiver 26 can include an antenna 27 for radio or microwave frequency communication with the user stations 23, 25. The access point 22 also has a processor 28, a program memory 29, and a random access memory 31. The user station 23 has a wireless transceiver 35 including an antenna 36 for communication with the access point station 22. In a similar fashion, the user station 24 has a wireless transceiver 38 and an antenna 39 for communication to the access point 22. By way of example, in some embodiments an authenticator could be employed within such an access point (AP) and/or a supplicant or peer could be employed within a mobile node or user station.

FIG. 2 shows an illustrative computer or control unit that can be used to implement computerized process steps, to be carried out by devices, such as, e.g., an access point, a computer, a server, a user station, a mobile device or other node in some embodiments. In some embodiments, the computer or control unit includes a central processing unit (CPU) 322, which can communicate with a set of input/output (I/O) device(s) 324 over a bus 326. The I/O devices 324 can include, for example, a keyboard, monitor, and/or other devices. The CPU 322 can communicate with a computer readable medium (e.g., conventional volatile or non-volatile data storage devices) 328 (hereafter "memory 328") over the bus 326. The interaction between a CPU 322, I/O devices 324, a bus 326, and a memory 328 can be like that known in the art. Memory 328 can include, e.g., data 330. The memory 328 can also store software 338. The software 338 can include a number of modules 340 for implementing the steps of processes. Conventional programming techniques may be used to implement these modules. Memory 328 can also store the above and/or other data file(s). In some embodiments, the various methods described herein may be implemented via a computer program product for use with a computer system. This implementation may, for example, include a series of computer instructions fixed on a computer readable medium (e.g., a diskette, a CD-ROM, ROM or the like) or transmittable to a computer system via and interface device, such as a modem or the like. A communication medium may be substantially tangible (e.g., communication lines) and/or substantially intangible (e.g., wireless media using microwave, light, infrared, etc.). The computer instructions can be written in various programming languages and/or can be stored in memory device(s), such as semiconductor devices (e.g., chips or circuits), magnetic devices, optical devices and/or other memory devices. In the various embodiments, the transmission may use any appropriate communications technology.

SUMMARY

The preferred embodiments of the present invention improve upon the foregoing and other background technologies.

According to some embodiments, a multiple interface device adapted to enable selection of connectivity options is provided that includes: a processor; memory; a plurality of network interfaces, including at least one wireless network interface; an evaluation module configured to evaluate connectivity of the interfaces based on both a) lower-layer information and b) network-layer information; a display configured to display results of the evaluation; and a user input configured to enable a user of the multiple interface device to select one of the interfaces based on the results displayed. In some examples, the device is configured to display the results of the evaluation before a network selection decision is input by a user via the user input. In some examples, the device is configured to display the results of the evaluation in a rank format before a network selection decision is input. In some examples, the lower-layer information includes signal strength, bit error rates, SNR and/or interference and/or the network-layer information includes IP connectivity and/or end-to-end path performance. In some examples, the network-layer information evaluation includes evaluation of the exchange of higher-layer application data packets, including HTTP or ICMP, between the multiple interface device and an external correspondent. In some examples, the interfaces include plural wireless interfaces.

In addition, in some embodiments, the network-layer information evaluations include evaluation of the exchange of packets with a test correspondent. For example, in some embodiments, the device is configured to select a test correspondent from a plurality of potential test correspondents. In some examples, the device is configured to select a test correspondent that has an ongoing session with the multiple interface device. In some other examples, the device is configured to select a test correspondent based on pre-established policies related to attributes and/or ongoing sessions. In some other examples, the device is configured to dynamically establish a list of test correspondents based on previously or frequently visited Internet or network sites. In some examples, the device is configured to enable a user to select the test correspondent. And, in some other examples, the network-layer information evaluations include the exchange or measurement of IP-level or above data packets with the test correspondent. In some embodiments, the multiple user interface device is configured to perform the evaluations automatically, while in some embodiments, the multiple user interface device is configured to perform the evaluations based on a user-inputted request. In some preferred examples, the results of the evaluations are presented to a user to view the user's available networking options.

According to some other embodiments, a mobile device for connecting with multiple networks is provided that includes: a processor; memory; at least one network interface(s); and the device being configured to perform IP connectivity and/or end-to-end IP path performance evaluations on available connectivity options before a network selection decision is made. In some embodiments, the mobile device is a multiple interface device. In some embodiments, the at least one network interface(s) includes at least one wireless interface. And, in some other embodiments, the device is configured to perform the evaluations at the request of a user, while the device is configured to perform the network selection decision at the request of a user.

The above and/or other aspects, features and/or advantages of various embodiments will be further appreciated in view of the following description in conjunction with the accompanying figures. Various embodiments can include and/or exclude different aspects, features and/or advantages where applicable. In addition, various embodiments can combine one or more aspect or feature of other embodiments where applicable. The descriptions of aspects, features and/or advantages of particular embodiments should not be construed as limiting other embodiments or the claims.

BRIEF DESCRIPTION OF THE DRAWINGS

The preferred embodiments of the present invention are shown by a way of example, and not limitation, in the accompanying figures, in which.

DETAILED DISCUSSION OF THE PREFERRED EMBODIMENTS

While the present invention may be embodied in many different forms, a number of illustrative embodiments are described herein with the understanding that the present disclosure is to be considered as providing examples of the principles of the invention and that such examples are not intended to limit the invention to preferred embodiments described herein and/or illustrated herein.

Figure 1:
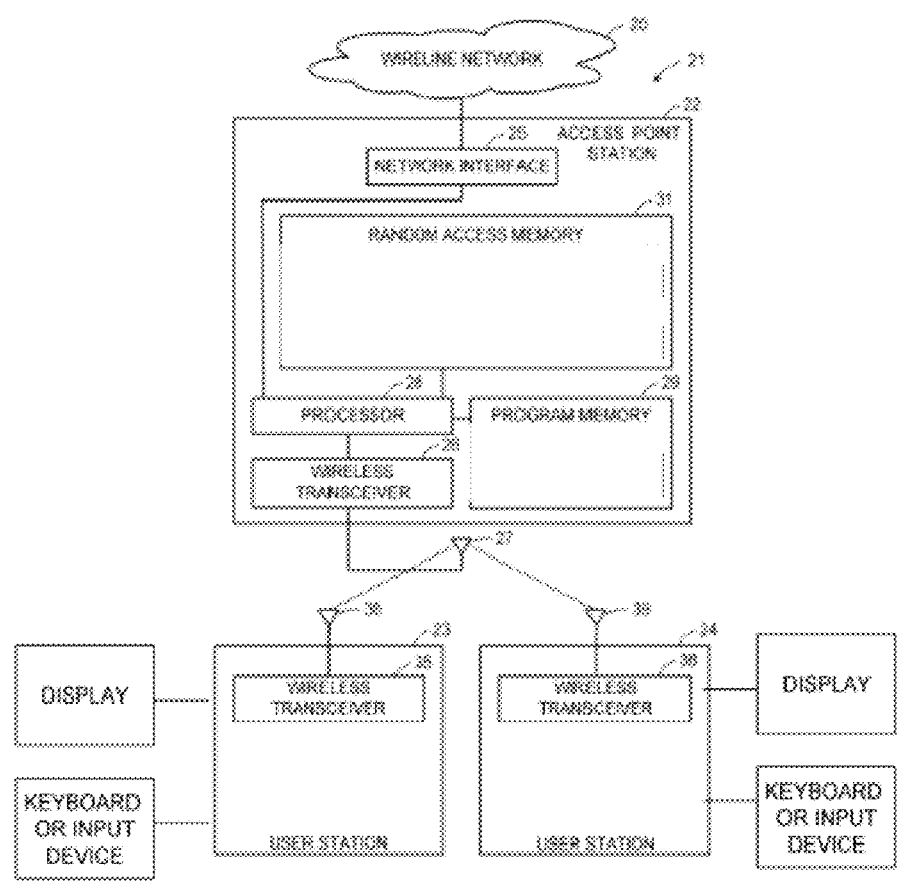
FIG. 1 is an illustrative architectural diagram demonstrating illustrative components of system architecture according to some examples.
Figure 2:
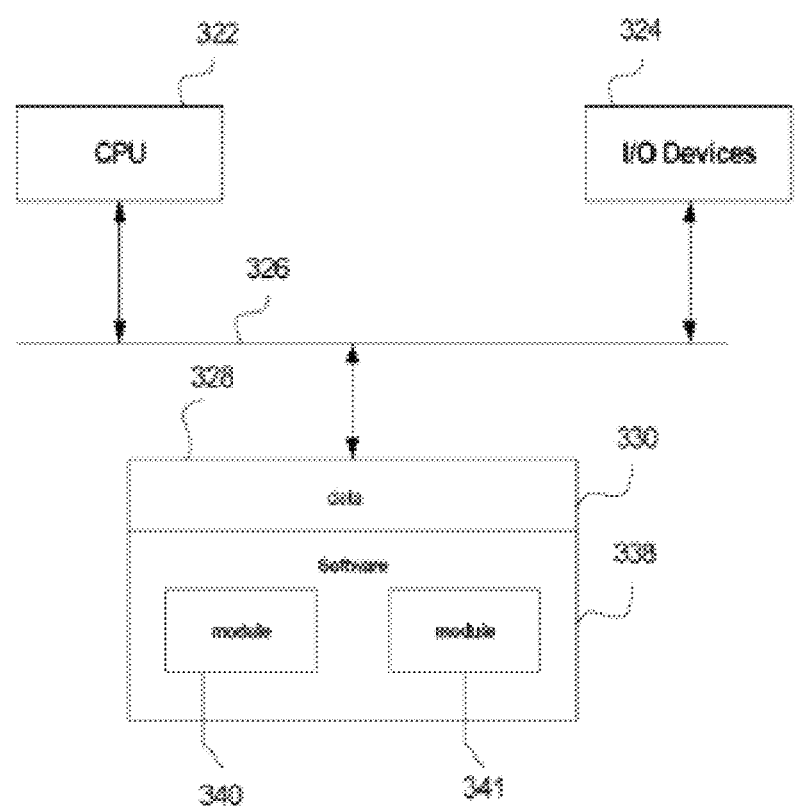
FIG. 2 shows features according to an illustrative computer or control unit that can be used to implement computerized process steps, to be carried out by devices, such as, e.g., an access point, a user station, a source node or destination node in some embodiments.
Figure 3:
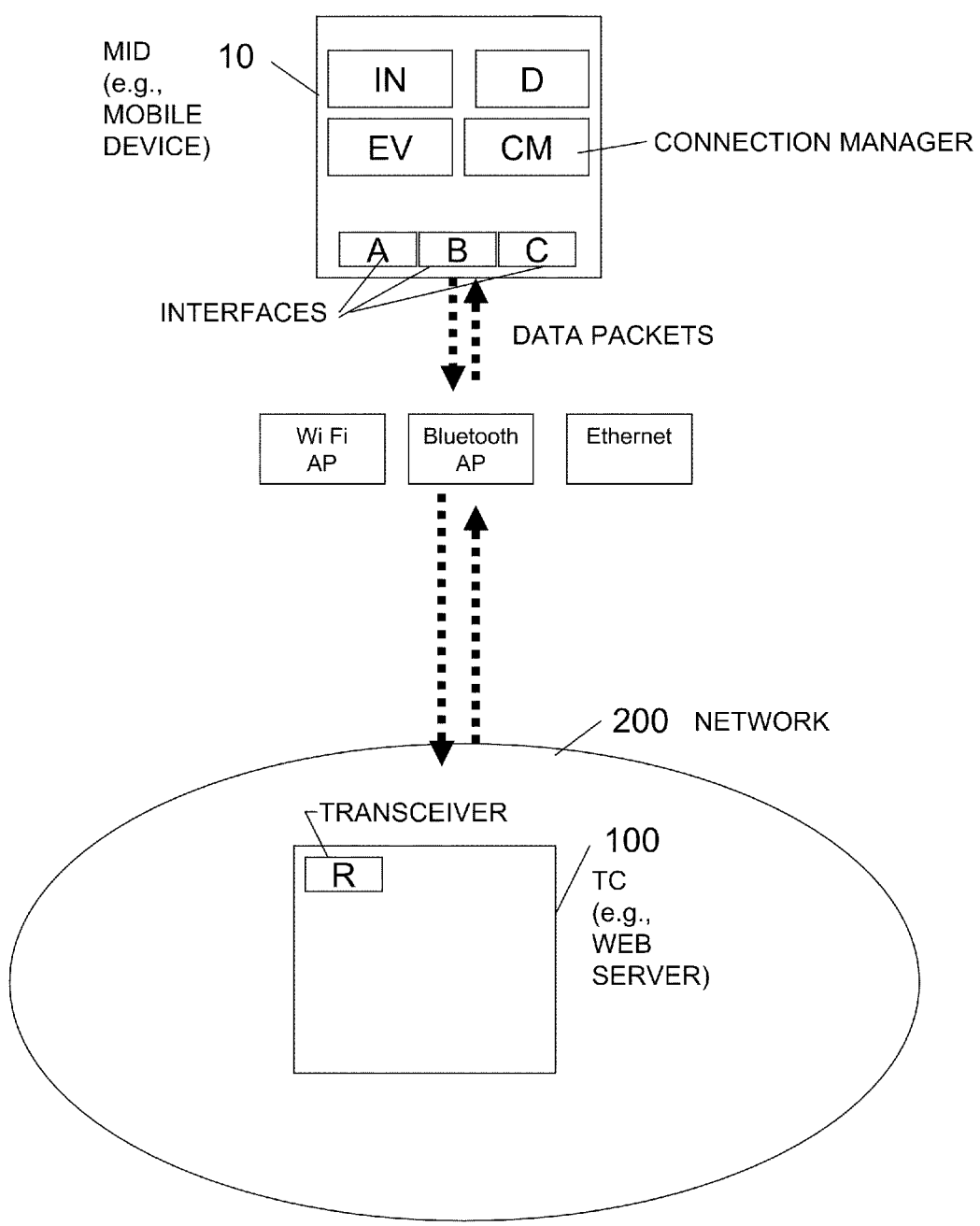
FIG. 3 shows an illustrative architecture according to some illustrative examples of the present invention.

The Preferred Embodiments:

The present application sets forth, among other things, novel techniques to evaluate and qualify multiple networking options. In some illustrative examples, a device (including, e.g., a mobile device such as, e.g., a portable computer, a lap top computer, a notebook computer, a personal digital assistant [PDA] and/or smart phone, such as, e.g., an iPHONE™, BLACKBERRY™ or the like, etc.) contains multiple network connectivity options, including but not limited to, e.g., various wireless and wired technologies, such as, e.g., Wi-Fi, 3G, WiMAX, LTE, Ethernet, Bluetooth, UWB, WHDMI, etc. (such as, e.g., employing a plurality of interfaces). By way of example, FIG. 3 shows an illustrative mobile user device having multiple interfaces A, B and C. In the preferred embodiments, each connectivity option can be evaluated and pre-qualified prior to the user selecting that mode of communication. This evaluation process preferably takes into account both 1) lower-layer information (such as, e.g., signal strength, bit error rates, SNR, and/or interference, etc.) and 2) network-layer information (such as, e.g., IP connectivity, end-to-end path performance and/or the like).

Methodology:

With reference to FIG. 3, in some embodiments a Multi-Interface Device 10 (such as, e.g., a mobile device having multiple interfaces) contains multiple networking options. For example, each networking option can each utilize a different access network technology, such as, e.g., the illustrative interfaces A, B and C shown in FIG. 3. These technologies can include, e.g., an IP-bearing technology including, but not limited to, wired technologies such as, e.g., Ethernet, cable and DSL and wireless interfaces such as, e.g., Wi-Fi, 3G, WiMAX, Bluetooth, UWB, WHDMI, etc. The preferred embodiments of the present invention describe a method and system for evaluating each of these networking options quickly (e.g., in real-time) so that the user of the multiple interface device (MID) can preferably receive and view, e.g., a rank-ordering of interfaces based on a variety of possible policies. For example, the device 10 shown in FIG. 3 can include an evaluation module EV (e.g., implemented using software, hardware and/or firmware) which is adapted to carry-out the evaluation of the networking options.

Figure 7:
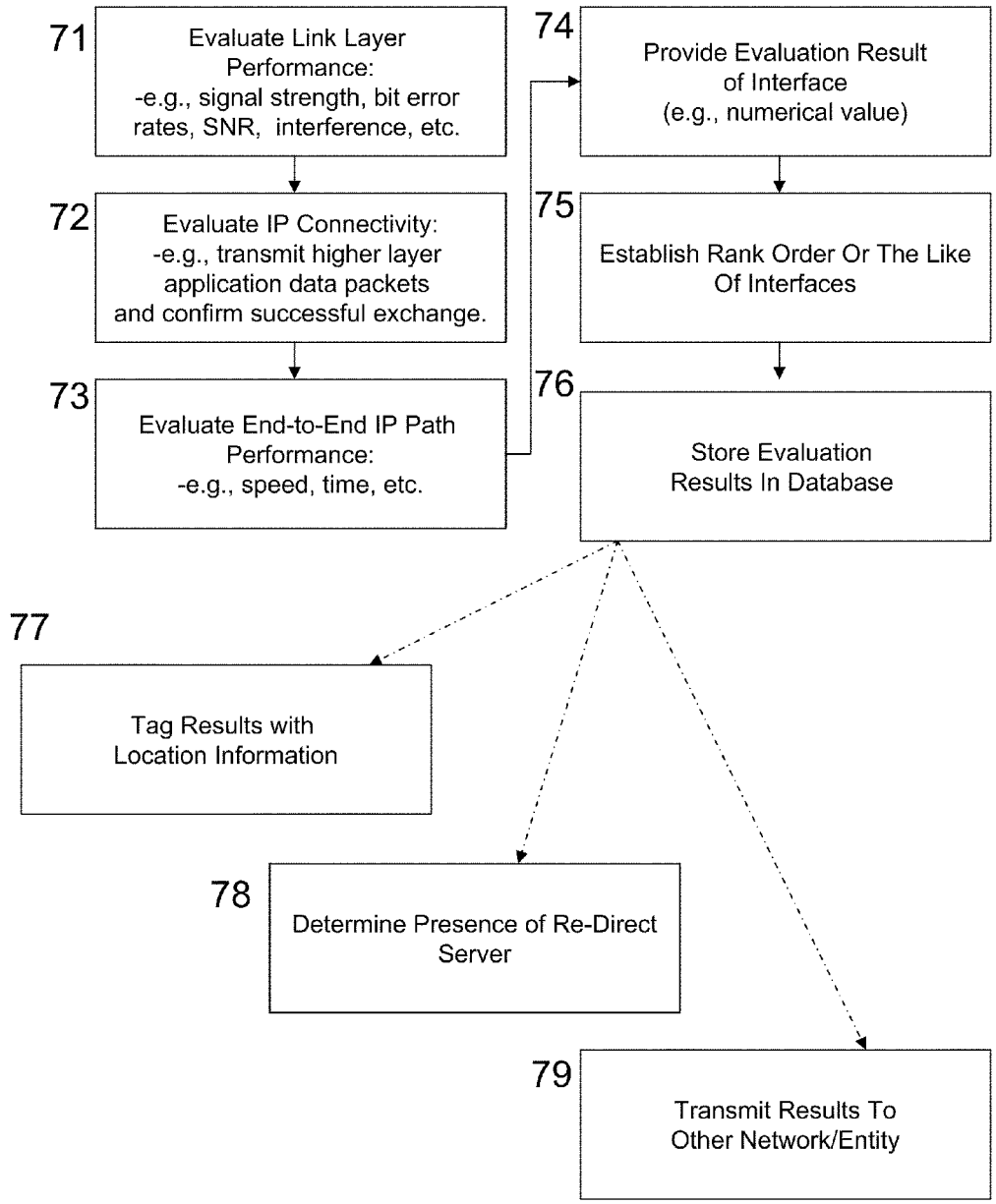
FIG. 7 is an illustrative flow diagram depicting illustrative process steps that can be carried out by, e.g., a multiple interface device (e.g., a mobile device having multiple interfaces) to evaluate test correspondents according to some illustrative examples of the present invention.

For reference, FIG. 7 is an illustrative flow diagram showing exemplary evaluation steps that can be carried out in some embodiments. In some embodiments, when the evaluation by the evaluation module is to be performed, the steps shown in FIG. 7 can be employed. In the preferred embodiments, the system performs both 1) lower-layer evaluation and 2) higher-layer (e.g., network-layer) evaluation. In particular, in preferred embodiments, in addition to certain link-layer specific information (see step 71), each IP interface is preferably evaluated based on its level of IP connectivity (see step 72) as well as based on its associated end-to-end IP path performance (see step 73). Preferably, IP connectivity is determined by the successful exchange of higher-layer application data packets such as HTTP or ICMP between the Multi-Interface Device and an external correspondent such as a web-server, or another network-client. In some preferred embodiments, IP path performance includes, e.g., the speed, roundtrip times, and/or other relevant information that describe the exchange of packets using that particular IP interface.

Entities:

In some preferred embodiments, as depicted in the illustrative example shown in FIG. 3, the following entities are involved:

1) A Multiple Interface Device (MID) 10 on which the multiple interface evaluations are taking place using the evaluation module EV.
2) A Test Correspondent 100 which is an IP-level entity that is exchanging IP-level and above packets with the MID. In some examples, the Test Correspondent can be, e.g., a web-server, another MID, or any other network entity.
3) A Service Provider which is the carrier who operates and manages a network 200 accessible by the MID. Service providers include, e.g., 3G operators, public and private Wi-Fi operators, DSL and Cable providers, etc.
4) A Network Interface (such as, e.g., interface(s) A, B and/or C shown in this illustrative example) which is a transceiver capable of exchanging information with a remote transceiver (such as, e.g., remote transceiver R shown in this example). In some illustrative embodiments, examples of network interfaces can include, e.g., Wi-Fi radio, 3G radio, Bluetooth radio and Ethernet transceivers.

Figure 4:
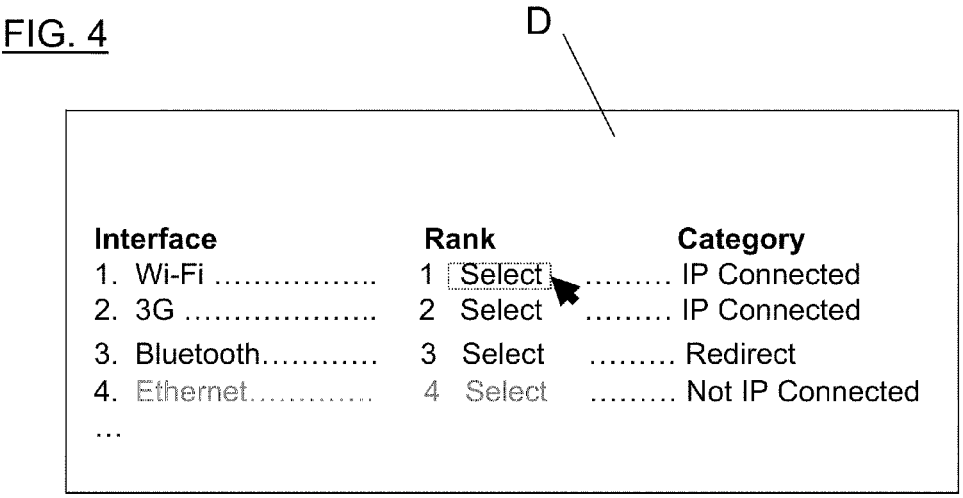
FIGS. 4 to 6 show some illustrative images (e.g., screen shots) of a display of a multiple interface device (e.g., a mobile device having multiple interfaces) according to some illustrative examples of the present invention.

Further Discussion:

In some embodiments, a device or mechanism (e.g., which can be provided on a MID device, such as, e.g., a mobile device as a software module, as hardware and/or firmware and/or which can be distributed across multiple devices) is provided that can perform IP-level pre-evaluations of available networking options. In some preferred embodiments, such pre-evaluations include, e.g., the exchange and measurement of IP-level and above data packets with a test correspondent. In other embodiments, a variety of other evaluation techniques can be employed. In some embodiments, these pre-evaluations can be performed automatically on the device without user request or intervention (e.g., the device can be configured in some embodiments to continually or periodically repeat steps shown in FIG. 7 for multiple interfaces); alternatively, some embodiments can be configured to perform such evaluation(s) at the explicit request of the user (e.g., in some embodiments, the device can include a user input interface (IN) with which a user can input the user's selection(s), such as, e.g., a key board, a touch screen and/or the like). In preferred embodiments, the results of such pre-evaluations can be presented to the user in one or more of a variety of ways so that the user can easily and at-a-glance understand and/or visualize their available networking options. By way of example, in some embodiments, the device can display the results on a display D as shown in FIG. 4 (such as, e.g., by providing a list of interfaces with numerical or the like rankings, with categorical indications, with color coding, and/or the like).

Figure 9:
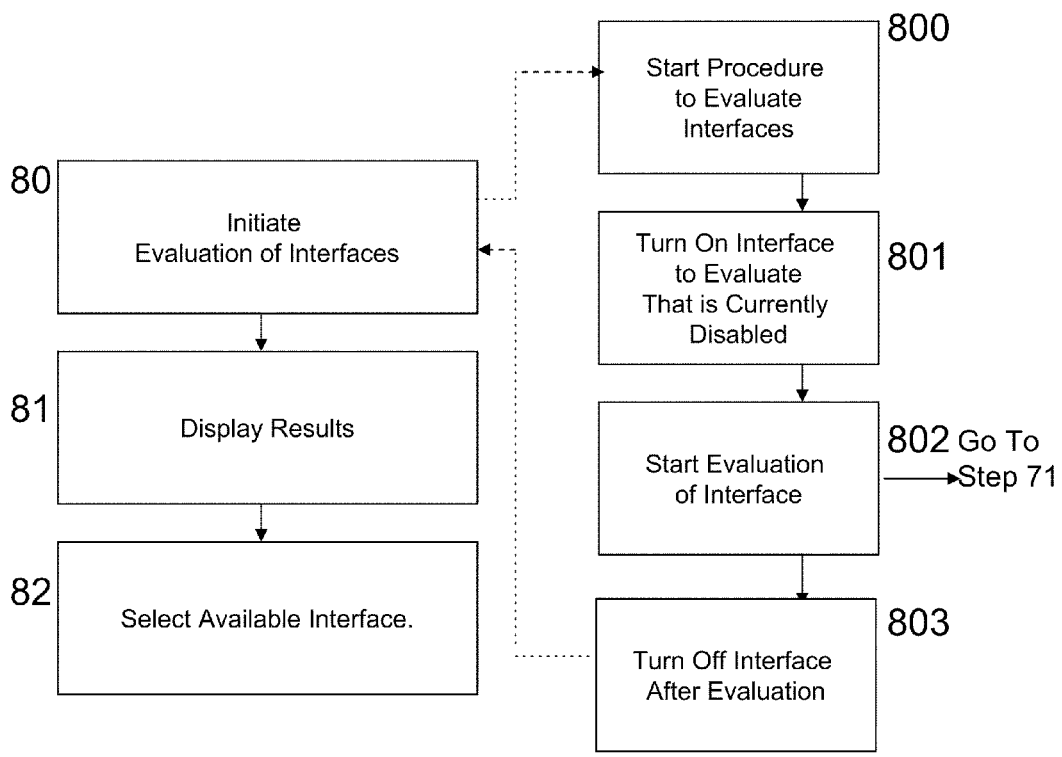
FIG. 9 is an illustrative flow diagram depicting illustrative process steps that can be carried out by, e.g., a multiple interface device (e.g., a mobile device having multiple interfaces) to carry out selection of interfaces according to some illustrative examples of the present invention.

In some embodiments, a device (such as, e.g., a mobile device) is provided containing multiple network interfaces, wherein the device is capable of performing IP connectivity and end-to-end IP path performance evaluations on available connectivity options before a network selection decision is made. For example, in some embodiments, as shown in FIG. 9, the mobile device can be configured to first initiate an evaluation of interfaces as shown at step 80, to display the results of said evaluation at step 81, and to provide for a selection of the interface at step 82. For example, in some embodiments, such selection can be carried out by the user via a user input IN as shown in FIG. 3 or the like. As one example, FIG. 4 shows an illustrative display screen D, with illustrative rankings of interfaces depicted, via which a user is capable manipulating a pointer to render a selection (e.g., see the arrow adjacent Rank item #1 in which a user is shown selecting the Wi-Fi interface in this illustrative example).

In some embodiments, a device (e.g., a mobile device) is provided containing a single network interface that is capable of performing IP connectivity and end-to-end IP path performance evaluations on available connectivity options before a network selection decision is made.

Figure 5:
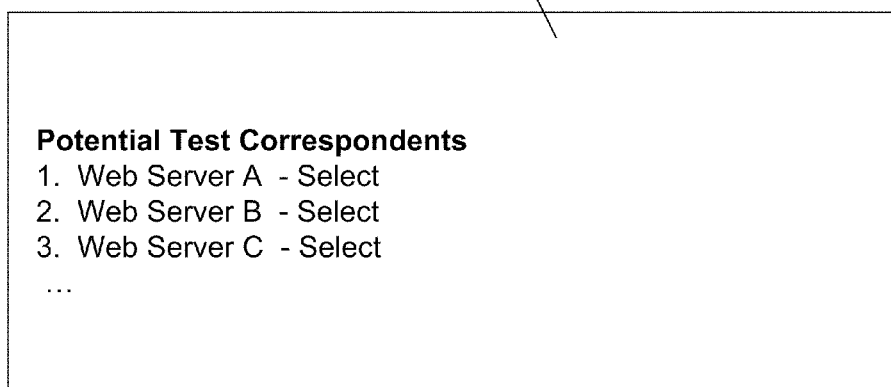
Figure 8:
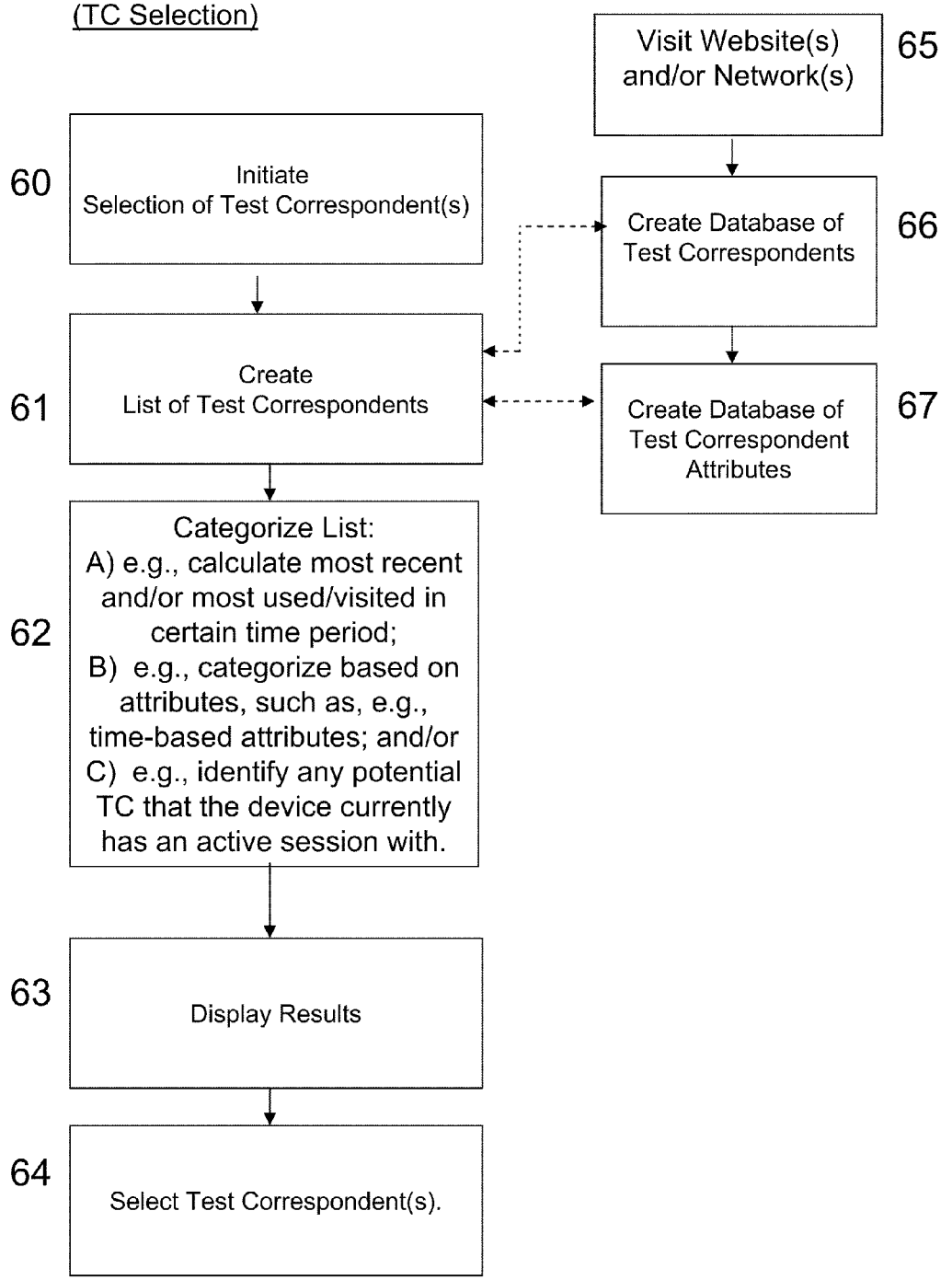
FIG. 8 is an illustrative flow diagram depicting illustrative process steps that can be carried out by, e.g., a multiple interface device (e.g., a mobile device having multiple interfaces) to carry out selection of test correspondents according to some illustrative examples of the present invention.

In some embodiments, the choice of a test-correspondent can be configured by the user (e.g., selected by the user); while in other embodiments, such a choice of a test-correspondent can be automatically selected (e.g., by the multiple interface device) or can be remotely selected (such as, e.g., selected remotely by, e.g., a network service provider—e.g., selected by the network service provider). For example, in some embodiments, prior to performing of the steps shown in FIG. 7, as shown in FIG. 5, a user can be presented with a list of potential test-correspondents (e.g., available test correspondents) which can be displayed via the display D and selected via the user input IN and/or the service provider can be adapted to select the test-correspondent. For reference, FIG. 8 depicts an illustrative methodology that can be implemented within the MID such that a user can select the test correspondent(s). As shown in this illustrative and non-limiting example, the method is initiated at step 60. As also shown, the MID can perform a routine that creates a list of test correspondents (e.g., based on information stored within, e.g., a database of test correspondents 66, a database of test correspondent attributes and/or other information). As also shown, steps 66 and 67 are both preferably based on the MID having visited web sites and/or networks as shown at step 65 (e.g., having established prior connections and communications therewith). In some preferred embodiments, the system can display the results at step 63, such as, e.g., as shown in the example depicted in FIG. 5. Then, the system can be configured to enable the user to select the desired test correspondent(s) at step 64.

In some embodiments, the set of test correspondents can be dynamically determined by examining a list of the device's and user's most frequently visited Internet sites. In some embodiments, this list can be stored within a database on the multiple interface device (MID), such as, e.g., within digital data storage or memory within a mobile device. In some embodiments, this list can be maintained according to certain time intervals, such as, e.g., a list of the X most recently visited sites in Y period of time. In some embodiments, the list of visited sites can also or can alternatively be categorized according to other attributes—such as, e.g., as some illustrative and non-limiting examples, a) time-based attributes, such as, e.g., time of the day, day of the week, and/or month of year, b) location-based attributes, c) prior history attributes (e.g., the system can maintain a log related to, e.g., prior evaluations of the test correspondents, prior reliability of such test correspondents and/or other issues/information related to the test correspondents, c) user preference attributes (e.g., in some embodiments, users can input attributes of importance to the user). In this way, in various embodiments, the test correspondents can be chosen according to a number of policies. Once again, in some preferred embodiments, the test correspondents can be displayed to the user for the user's selection. And, in some embodiments, the test correspondents can be selected automatically by the system, or can be selected remotely by another entity (such as, e.g., based on pre-established preferences, preferably taking into account information contained in the list of test correspondents).

Figure 6:
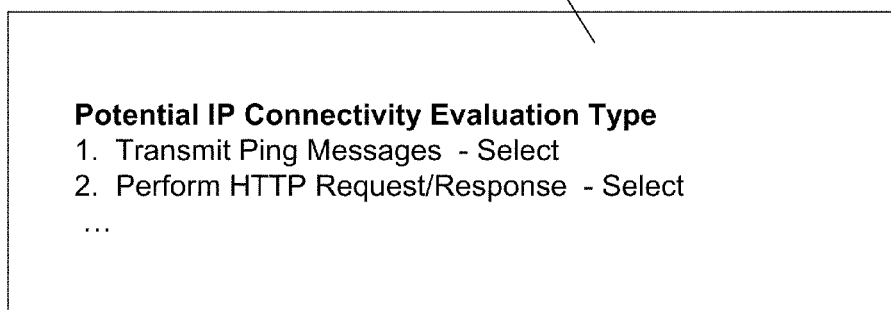

As shown in FIG. 8, in some embodiments, one illustrative policy includes choosing test correspondents from the most recently visited list. See, e.g., step 62 at A. Furthermore, as shown in FIG. 6, in some examples, another policy can be to choose TCs according to a list of most visited sites at a particular time (e.g., at or near to the current time of the test (1:00 pm for example)). See, e.g., step 62 at B. In some examples, this time can also incorporate other time-based attributes, such as, e.g., day of week, month of year or the like.

As further shown in FIG. 8, in some embodiments, the TCs can also or can alternatively be dynamically chosen according to the active on-going sessions. See, e.g., step 62 at C. For example, the user can have active sessions (e.g., TCP or UDP) with Internet hosts A and B. In such a case, Internet hosts A and B can be used as TCs for evaluating the performance of candidate interfaces other than the one in current use.

In some embodiments, the choice of the type of evaluation (such as, e.g., the type of IP connectivity evaluation) can be configured by the user (such as, e.g., by having the user input a selection using the IN) and/or a graphical user interface presented on the display D. See, e.g., FIG. 6. In some embodiments, the choice of the type of IP connectivity evaluation can be configured remotely by, e.g., the network service provider. In some examples, one or more of the following methods could be employed to effect such IP connectivity evaluations: ping messages, HTTP Request/Response methods, and/or other methods as would be appreciated based on this disclosure.

In some embodiments, the IP evaluation system can run in parallel and can make many IP evaluations simultaneously across all available interfaces.

In some embodiments, the system is configured such that the IP evaluation procedure can run multiple tests simultaneously—such as, e.g., for each IP evaluation procedure to simultaneously test different unique test-correspondents.

In some embodiments, the results of the IP evaluation can be stored in a database, compiled and used for future analysis. See, e.g., step 76 shown in FIG. 7. In some embodiments, the results of the IP evaluation can be, e.g., tagged with a current location of the Multiple Interface Device so as to build a geographically relevant database of IP evaluation results. See, e.g., step 77 shown in FIG. 7. In some embodiments, the results of the IP evaluations can be, e.g., parsed to determine the presence of a re-direct server. See, e.g., step 78 shown in FIG. 7. For example, this can occur by looking at the HTTP Response packets that are returned and comparing the IP addresses as well as the internal contents of the HTML messages. If a re-direct server is detected, this information can be, e.g., used in presenting the results to the Multiple Interface Device user or in any automatic selection process that may depend upon such results.

In some embodiments, the results of the IP evaluations can be, e.g., aggregated and delivered to the network service provider or other network entity for later processing, display and analysis. See, e.g., step 79 shown in FIG. 7. In some examples, Multiple Interface Devices (such as, e.g., mobile devices) can transmit results of such evaluations to a network service provider and/or other entity and, e.g., can optionally transmit the MID's geographical information, information regarding application use and/or other information, which information can be stored by the network service provider (e.g., in a network database), and which information can be later transmitted for future use by that and/or other MID's for selection of interfaces.

In some embodiments, the IP evaluations (such as, e.g., carried out in step 72 shown in FIG. 7) can include, e.g., the sending and reception of a single HTTP Request/Response pair or may include the sending and reception of several such pairs. Preferably, the time that each HTTP Request is transmitted will be recorded and compared with the time with which a corresponding Response is received. These times can be used to determine effective throughput and delay performance.

In the preferred embodiments, each interface tested will be categorized based on the outcome of the IP evaluation. In some embodiments, result categories can include, e.g., but are not limited to, IP Connected, Redirect, and Not IP Connected. See e.g. the illustrative categories shown in the example depicted in FIG. 4 under the caption "Category."

In some embodiments, results from each interface under test can be compared and a rank-ordered to create a list based on, for example, throughput and/or delay performance. See e.g. the illustrative rankings shown in the example depicted in FIG. 4 under the caption "Rank."

In some embodiments, a connection manager CM, such as, e.g., depicted in FIG. 3, which can be implemented employing, e.g., via software, hardware and/or firmware within the MID, can be configured to carry out connection functionality of the MID, as well as to carry out other functionality described herein related to the MID. By way of example, in some embodiments, the connection manager CM can be configured to cause the MID device to display the outcomes and current status of all connectivity tests for all active interfaces upon the display D. In addition, the connection manager CM can be configured to manage connection of interfaces either upon selection by a user of the MID and/or via an automatic selection process.

In some embodiments, the radios associated with each link can be disabled when not in use and automatically enabled when an evaluation using that radio is required. For example, the connection manager CM can be configured to cause said links to be disabled or turned off when not required and to be turned back on for carrying out an evaluation, even prior to selection of the link or interface. For reference, FIG. 9 shows an illustrative embodiment in which the procedure to evaluate an interface is started at step 800; then, at step 801, an interface that is not in use that is to be evaluated is turned on; then, at step 802, the evaluation of the interface is started by proceeding to, e.g., step 71 in FIG. 7; then, at step 803, the interface can be turned off after evaluation.

In some embodiments, a test database can, thus, be provided that will receive test results from MIDs that have performed network evaluation tests. In some embodiments, a MID will deliver test results to this test database where they will be stored, and potentially accessed and mined for information about network performance. In some embodiments, the test Database will be a network element and accessible over a public or private network. In some embodiments, the addition of location information will be appended to the performance evaluation tests. In some examples, the MID will add its location, if known, to the test results that are sent to the test database. In addition, in some examples, the addition of a timestamp that will accompany all test results. In some embodiments, the test database will store test results and have them indexed by time, geography and interface technology (Wi-Fi, 3G, Ethernet, etc.)

In some embodiments, a dedicated test correspondent can, thus, be specifically designed to facilitate testing. Preferably, this will be a network element that is publically available and reachable. In one example, a MID will use this dedicated test correspondent as a testing end point with which to conduct performance evaluations over the MID's available interfaces.

In some embodiments, a method of testing can be performed whereby parallel tests over each interface under test are conducted simultaneously. In some examples, the parallel testing mode of operation include that the parallel tests are conducted with the dedicated test correspondent as a testing end point. In the latter case, the dedicated test correspondent will preferably analyze incoming IP packet streams arriving over the multiple access links. Preferably, these packets will carry IP addresses associated with each of the interfaces under test. In addition, the dedicated test correspondent can be configured to analyze the arrival times and the inter-arrival times (time between two consecutive arrivals) of these packets against those arriving with different IP addresses. The dedicated test correspondent can also be configured to compile statistics, such as, e.g., including average inter-arrival time, maximum inter-arrival time and standard deviation of arrival times for each of the packet streams. Furthermore, the dedicated test correspondent can be configured to then deliver a report detailing the timing behavior of the interfaces under test back to the MID. The MID can then use this information in its automated decision making, or can display this information to the end user to assist in their decision making.

Broad Scope of the Invention:

While illustrative embodiments of the invention are set forth and described herein, the present invention is not limited to the various preferred embodiments described herein, but includes any and all embodiments having equivalent elements, modifications, omissions, combinations (e.g., of aspects across various embodiments), adaptations and/or alterations as would be appreciated by those in the art based on the present disclosure. The limitations in the claims (e.g., including that to be later added) are to be interpreted broadly based on the language employed in the claims and not limited to examples described in the present specification or during the prosecution of the application, which examples are to be construed as non-exclusive. For example, in the present disclosure, the term "preferably" is nonexclusive and means "preferably, but not limited to." In this disclosure and during the prosecution of this application, means-plus-function or step-plus-function limitations will only be employed where for a specific claim limitation all of the following conditions are present in that limitation: a) "means for" or "step for" is expressly recited; b) a corresponding function is expressly recited; and c) structure, material or acts that support that structure are not recited. In this disclosure and during the prosecution of this application, the terminology "present invention" or "invention" may be used as a reference to one or more aspect within the present disclosure. The language present invention or invention should not be improperly interpreted as an identification of criticality, should not be improperly interpreted as applying across all aspects or embodiments (i.e., it should be understood that the present invention has a number of aspects and embodiments), and should not be improperly interpreted as limiting the scope of the application or claims. In this disclosure and during the prosecution of this application, the terminology "embodiment" can be used to describe any aspect, feature, process or step, any combination thereof, and/or any portion thereof, etc. In some examples, various embodiments may include overlapping features. In this disclosure, the following abbreviated terminology may be employed: "e.g." which means "for example" and "i.a." which means "inter alia."

What is claimed is:

1. A multiple interface device adapted to enable selection of connectivity options, comprising:
   a) a processor;
   b) memory;
   c) a plurality of network interfaces, including at least one wireless network interface;
   d) an evaluation module configured to evaluate connectivity of each of said plurality of network interfaces based on both a) lower-layer information and b) network-layer information;
   e) a display configured to display results of said evaluation as a list of said plurality of network interfaces;
   f) a user input configured to enable a user of the multiple interface device to select one of said plurality of network interfaces based on said results displayed,
   g) wherein said device is configured to display said results of said evaluation in a rank format before a network selection decision is input; and
   wherein said network-layer information evaluations include evaluation of an exchange of packets with a test correspondent that exchanges IP level packets with the multiple interface device, wherein the multiple interface device conducts parallel tests with the test correspondent as a testing end point to analyze incoming IP packet streams arriving over said plurality of network interfaces of said multiple interface device, and wherein said multiple interface device is configured a) to provide an automatic selection of a test correspondent from a plurality of potential test correspondents or b) to enable a user to select a test correspondent from a plurality of potential test correspondents, wherein said plurality of potential test correspondents includes currently actively accessed, previously accessed or frequently accessed network elements.

2. The multiple interface device of claim 1, wherein said device is configured to display said results of said evaluation with said list of said interfaces before an interface selection decision is input by a user via said user input.

3. The multiple interface device of claim 1, wherein said device is configured to display said results of said evaluation in said rank format with alphanumerical rankings of each interface before a network interface selection decision is input.

4. The multiple interface device of claim 1, wherein said lower-layer information includes signal strength, bit error rates, SNR and/or interference.

5. The multiple interface device of claim 1, wherein said network-layer information includes IP connectivity and/or end-to-end path performance.

6. The multiple interface device of claim 1, wherein said network-layer information evaluation includes evaluation of the exchange of higher-layer application data packets, including HTTP or ICMP, between the multiple interface device and an external correspondent.

7. The multiple interface device of claim 1, wherein said interfaces include plural wireless interfaces.

8. The multiple interface device of claim 1, wherein said device is configured to select a test correspondent from said plurality of potential test correspondents.

9. The multiple interface device of claim 8, wherein said device is configured to enable a user to select said test correspondent.

10. The multiple interface device of claim 1, wherein said device is configured to select a test correspondent that has an ongoing session with the multiple interface device.

11. The multiple interface device of claim 1, wherein said device is configured to select a test correspondent based on pre-established policies related to attributes and/or ongoing sessions.

12. The multiple interface device of claim 1, wherein said device is configured to dynamically establish a list of said potential test correspondents based on previously accessed or frequently accessed network sites accessed by said multiple interface device.

13. The multiple interface device of claim 1, wherein said network-layer information evaluations include the exchange or measurement of IP-level or above data packets with said test correspondent.

14. The multiple interface device of claim 1, wherein said multiple user interface device is configured to perform said evaluations automatically.

15. The multiple interface device of claim 1, wherein said multiple user interface device is configured to perform said evaluations based on a user-inputted request.

16. The multiple interface device of claim 1, wherein results of said evaluations are presented to a user to view the user's available networking options.

17. The multiple interface device of claim 1, wherein said plurality of potential test correspondents includes currently actively accessed, previously accessed or frequently accessed Internet or network sites accessed by the multiple interface device.

18. The multiple interface device of claim 1, wherein said plurality of potential test correspondents is determined by said multiple interface device.

19. The multiple interface device of claim 18, wherein said plurality of potential test correspondents is adapted based on pre-established attributes or policies.

20. A mobile device for connecting with multiple networks, comprising:
   a) a processor;
   b) memory;
   c) a plurality of network interfaces; and
   d) said mobile device being configured to perform IP connectivity and/or end-to-end IP path performance evaluations on each of said plurality of network interfaces before an interface selection decision is made, and said mobile device being configured to display a list of said plurality of network interfaces along with results of said performance evaluations for user selection;
   e) wherein said mobile device is configured to display said results of said evaluation in a rank format before a network interface selection decision is input; and
   wherein said evaluations include evaluation of an exchange of packets with a test correspondent that exchanges IP level packets with the mobile device, wherein the mobile device conducts parallel tests with the test correspondent as a testing end point to analyze incoming IP packet streams arriving over said plurality of network interfaces of said mobile device, and wherein said mobile device is configured a) to provide an automatic selection of a test correspondent from a plurality of potential test correspondents or b) to enable a user to select a test correspondent from a plurality of potential test correspondents, wherein said plurality of potential test correspondents includes currently actively accessed, previously accessed or frequently accessed network elements.

21. The mobile device of claim 20, wherein said mobile device is a multiple interface device.

22. The mobile device of claim 20, wherein said at least one network interface(s) includes at least one wireless interface.

23. The mobile device of claim 20, wherein said device is configured to perform said evaluations at the request of a user.

24. The mobile device of claim 20, wherein said device is configured to perform said network interface selection decision at the request of a user.

25. The mobile device of claim 20, further including said mobile device being configured to communicate with a system for storing and mining information regarding network performance for multiple interface devices, comprising:
   a) a test database, said test database being a network element accessible over a public or private network, configured to receive test results from multiple interface devices, including said mobile device, that have performed network evaluation tests;
   b) said mobile device, along with a plurality of multiple interface devices, being configured to deliver test results to said test database for storage and access;
   c) said test database being configured to provide access and mining of information about network performance by multiple interface devices.

26. The mobile device of claim 25, wherein said part b) includes that said mobile device is configured to add its location to the test results that are sent to the test database.

27. The mobile device of claim 25, wherein said part b) includes that said mobile device is configured to add a timestamp to accompany test results.

28. The mobile device of claim 25, wherein said test database is configured to store test results that are indexed by time, geography and/or interface technology.

29. The mobile device of claim 20, further including said mobile device being configured to communicate with a system for obtaining information about network performance for multiple interface devices, comprising:
   a) a dedicated test correspondent for carrying out testing of interfaces of multiple interfaces devices, including said mobile device, wherein said dedicated test correspondent is a network element that is publically available and reachable by said multiple interface devices, including said mobile device, such that said multiple interface devices, including said mobile device, use said dedicated test correspondent as a testing end point to conduct performance evaluations over the multiple interface devices' available interfaces.

30. A system for testing of interfaces of a multiple interface device, comprising:
   a multiple interface device, including a processor and a memory, configured to perform a parallel testing mode of operation in which simultaneous parallel tests over a plurality of interfaces of the multiple interface device are performed to obtain information related to said plurality of interfaces;
   a dedicated test correspondent configured to enable performance of parallels tests as a testing end point with said multiple interface device in said parallel testing mode of operation, said multiple interface device being configured to enable selection of said dedicated test correspondent from a plurality of potential test correspondents, wherein said plurality of potential test correspondents includes currently actively accessed, previously accessed or frequently accessed network elements;
   wherein said system is configured to analyze incoming IP packet streams arriving over said plurality of interfaces, wherein said incoming IP packet streams carry IP addresses associated with each of said plurality of interfaces being tested;
   wherein said system is configured to analyze arrival times and/or inter-arrival times between two consecutive arrivals of said incoming IP packet streams with a same IP address against those of said incoming IP packet streams arriving with different IP addresses; and
   wherein said multiple interface device includes a display configured to display results of said parallel testing mode of operation as a list of said plurality of interfaces and a user input configured to enable a user of the multiple interface device to select one of said plurality of interfaces based on said results displayed, wherein said multiple interface device is configured to display said results of said parallel testing mode of operation in a rank format before a interface selection decision is input.

31. The system of claim 30, wherein said dedicated test correspondent is configured to compile statistics for each packet stream.

32. The system of claim 31, wherein said statistics include average inter-arrival time, maximum inter-arrival time and/or standard deviation of arrival times for each of the packet streams.

33. The system of claim 31, wherein said dedicated test correspondent is configured to deliver a report detailing the timing behavior of the interfaces under test back to a multiple interface device upon request from the multiple interface device.

34. The system of claim 33, wherein said multiple interface device is configured to use the report received from the dedicated test correspondent in its automated decision making and/or to display this information to the end user to assist in the end user's decision making.

* * * * *